United States Patent
Doi et al.

(10) Patent No.: US 8,222,334 B2
(45) Date of Patent: Jul. 17, 2012

(54) WATER-BASED INKS FOR INK-JET PRINTING

(75) Inventors: Yasuhiro Doi, Wakayama (JP); Yasushi Ito, Wakayama (JP); Nobuyuki Takizawa, Wakayama (JP); Shigeki Nagashima, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/036,366

(22) Filed: Feb. 28, 2011

(65) Prior Publication Data

US 2011/0152442 A1     Jun. 23, 2011

Related U.S. Application Data

(62) Division of application No. 11/575,193, filed as application No. PCT/JP2005/018828 on Oct. 6, 2005, now abandoned.

(30) Foreign Application Priority Data

Oct. 7, 2004   (JP) ................ 2004-295464
Mar. 8, 2005   (JP) ................ 2005-064054

(51) Int. Cl.
    *C08K 5/11* (2006.01)
(52) U.S. Cl. .................. 524/311; 524/306
(58) Field of Classification Search .......... 524/284, 524/306, 311
    See application file for complete search history.

(56) References Cited

U.S. PATENT DOCUMENTS

| | | | |
|---|---|---|---|
| 3,936,303 A | 2/1976 | Shiba et al. | |
| 4,260,531 A | 4/1981 | Wachtel et al. | |
| 4,610,554 A | 9/1986 | Suzuki et al. | |
| 5,755,860 A | 5/1998 | Zhu | |
| 5,958,123 A | 9/1999 | De La Fuente | |
| 6,133,316 A | 10/2000 | Ostensen et al. | |
| 7,803,852 B2 | 9/2010 | Doi et al. | |
| 2002/0058111 A1* | 5/2002 | Debikey et al. | 427/385.5 |
| 2003/0027892 A1 | 2/2003 | Wang et al. | |
| 2003/0035149 A1 | 2/2003 | Ishikawa et al. | |
| 2003/0087988 A1 | 5/2003 | Nakano et al. | |
| 2003/0184629 A1 | 10/2003 | Valentini et al. | |
| 2009/0068359 A1 | 3/2009 | Doi et al. | |
| 2009/0068361 A1 | 3/2009 | Doi et al. | |
| 2010/0152367 A1 | 6/2010 | Doi et al. | |

FOREIGN PATENT DOCUMENTS

| | | |
|---|---|---|
| EP | 1 323 789 | 7/2001 |
| EP | 1 158 030 | 11/2001 |
| JP | 8-157760 | 6/1996 |
| JP | 8-157761 | 6/1996 |
| JP | 10-316918 | 12/1998 |
| JP | 2001-329199 | 11/2001 |
| JP | 2002-294105 | 10/2002 |
| JP | 2003-292853 | 10/2003 |
| JP | 2004-26988 | 1/2004 |
| JP | 2004-075759 | 3/2004 |
| JP | 2004-115589 | 4/2004 |
| JP | 2004-210951 | 7/2004 |
| JP | 2005-515289 | 5/2005 |
| WO | WO 03/062331 A1 | 7/2003 |

OTHER PUBLICATIONS

Machine translation of JP 08-157761. Jun. 1996.*
Meylan, William M. et al., "Atom/Fragment Contribution Method for Estimating Octanol-Water Partition Coefficients", Journal of Pharmaceutical Sciences, vol. 84, No. 1, pp. 83-92, Jan. 1995.
Machine translation of JP 2004-115589, Apr. 2004.
Machine translation of JP 2004-075759, Mar. 2004.
Machine translation of JP 2001-329199, Nov. 2001.
Trioctyl Phosphate MSDS.
Office Action issued Dec. 21, 2010 in Japanese Patent Application No. 2005-292669 (with English translation).

* cited by examiner

*Primary Examiner* — Milton I Cano
*Assistant Examiner* — John Uselding
(74) *Attorney, Agent, or Firm* — Oblon, Spivak, McClelland, Maier & Neustadt, L.L.P.

(57) ABSTRACT

The present invention relates to a water-based ink for ink-jet printing which not only satisfies a high optical density but also exhibits an excellent high lighter-fastness; a water dispersion used for the water-based ink; and a method for producing a print using the water-based ink. There are provided a water dispersion for ink-jet printing comprising (i) (A-1) polymer particles containing a colorant, (B) polymer particles and (C) the water-insoluble organic compound, or (ii) (A-2) self-dispersible pigment, (B) polymer particles and (C) the water-insoluble organic compound; a water-based ink containing the water dispersion; and a method for producing a print using the water-based ink.

13 Claims, No Drawings

WATER-BASED INKS FOR INK-JET PRINTING

CROSS REFERENCES TO RELATED APPLICATIONS

This application is a divisional application of U.S. patent application Ser. No. 11/575,193, filed on Mar. 13, 2007, now abandoned, which was a 371 of International Patent Application No. PCT/JP05/018828, filed on Oct. 6, 2005, and claims priority to Japanese Patent Application No. 2004-295464, filed on Oct. 7, 2004, and Japanese Patent Application No. 2005-064054, filed on Mar. 8, 2005.

FIELD OF THE INVENTION

The present invention relates to water-based inks for ink-jet printing, water dispersions used for the water-based inks, and a method for producing prints using the water-based inks.

BACKGROUND OF THE INVENTION

In ink-jet printing methods, droplets of ink are directly projected onto a recording medium from very fine nozzles and allowed to adhere to the recording medium, to form characters and images. The ink-jet printing methods have been rapidly spread because of their various advantages such as easiness of full coloration, low costs, capability of using ordinary paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate (for example, refer to JP 2002-294105A, JP 2001-329199A, JP 8-157761A, JP 2003-183554A, JP 2004-75759A, JP 2003-138179A, JP 2003-147236A and JP 2004-115589A).

JP 2002-294105A discloses a recording solution to which an emulsion obtained by conducting polymerization in the presence of a reactive surfactant is added to prevent clogging of nozzles with pigments.

JP 2001-329199A discloses an ink composition containing a self-dispersible pigment and polymer particles to improve a high lighter-fastness and a rubbing resistance thereof.

JP 8-157761A discloses a water-based ink containing an oil film-forming component which is prepared by dissolving a water-insoluble resin therein to suppress color bleeding. JP 2003-183554A discloses a water-based ink which contains 10 to 1000 ppm of a phthalic diester and a latex in order to form images having a good gloss. JP 2004-75759A discloses a dispersion of colored fine particles in which a hydrophobic pigment, a hydrophobic polymer and a high-boiling organic solvent are micro-capsulated with an urethane group-containing resin.

JP 2003-138179A and JP 2003-147236A disclose pigment-containing inks for ink-jet printing which contain aliphatic acids and derivatives thereof. JP 2004-115589A discloses a water-based ink containing a self-dispersible pigment, a resin and an organic solvent exhibiting a solubility in water of 10% by weight or lower.

However, these conventional inks have failed to exhibit both a high optical density and an excellent high lighter-fastness to a sufficient extent.

SUMMARY OF THE INVENTION

The present invention relates to a water-based ink for ink-jet printing which not only satisfies a high optical density but also exhibits an excellent high lighter-fastness; a water dispersion used for the water-based ink; and a method for producing a print (inclusive of printed matter) using the water-based ink.

The present inventors have found that a water dispersion containing a colorant, polymer particles and a water-insoluble organic compound can provide a water-based ink for ink-jet printing which exhibits a sufficient optical density as well as an excellent high lighter-fastness.

Thus, the present invention relates to the following aspects [1] to [4]:

[1] A water dispersion for ink-jet printing containing (A-1) polymer particles containing a colorant, (B) polymer particles and (C) a water-insoluble organic compound.

[2] A water dispersion for ink-jet printing containing (A-2) self-dispersible pigment, (B) polymer particles and (C) a water-insoluble organic compound.

[3] A water-based ink for ink-jet printing containing the water dispersion as defined in any one of the above aspect [1] or [2].

[4] A method for producing a print, containing the step of printing images or characters on an ordinary paper (plain paper, recycled paper) with the water-based ink as defined in the above aspect [3] by an ink jet printing method.

DETAILED DESCRIPTION OF THE INVENTION

The water dispersion for ink-jet printing according to the present invention includes the following water dispersions [1] or [2]:

[1] A water dispersion for ink-jet printing containing (A-1) polymer particles containing a colorant, (B) polymer particles and (C) the water-insoluble organic compound.

[2] A water dispersion for ink-jet printing containing (A-2) self-dispersible pigment, (B) polymer particles and (C) the water-insoluble organic compound.

The respective components used in these water dispersions are explained below.

Colorant

The colorant is not particularly limited, and there may be used any of pigment, hydrophobic dye, and water-soluble dye such as acid dye, reactive dye and direct dye. The colorant used in the present invention is preferably pigment or hydrophobic dye in view of a good water resistance, a good dispersion stability and a good rubbing resistance. Among these colorants, to meet the recent strong demand for a high weather resistance, preferred is the pigment.

The pigment or hydrophobic dye used in the water-based ink is required to be present in the form of stable fine particles using a surfactant or a polymer. In particular, in view of anti-bleeding property and water resistance, the pigment and/or hydrophobic dye is preferably included in the polymer particles.

The pigment may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue, C.I. Pigment Green, etc., with various product numbers.

Examples of the extender pigment include silica, calcium carbonate and talc.

The hydrophobic dyes are not particularly limited as long as they are capable of being included in the polymer particles. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer, such as preferably methyl ethyl ketone.

Examples of the hydrophobic dyes include oil-soluble dyes and disperse dyes. Among these dyes, preferred are oil-soluble dyes.

Examples of the oil-soluble dyes include one or more dyes selected from the group consisting of commercially available products marketed from Orient Chemical Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

Examples of the disperse dyes include one or more dyes selected from the group consisting of commercially available products marketed under the tradenames C.I. Disperse Yellow, C.I. Disperse Orange, C.I. Disperse Red, C.I. Disperse Violet, C.I. Disperse Blue, C.I. Disperse Green, etc., with various product numbers. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

The above colorants may be used alone or in the form of a mixture containing any two or more thereof at an optional mixing ratio.

(A-1) Polymer Particles Containing Colorant (Hereinafter Occasionally Referred to Merely as "Colorant-Containing Particles")

The colorant is preferably carbon black. As the carbon black, there may be used the same carbon blacks as exemplified previously. Examples of commercially available carbon blacks include "MONARCH" series such as "MONARCH 1300", "MONARCH 1000", "MONARCH 1100", "MONARCH 880" and "MONARCH 800" and "MOGUL L, REGAL" series such as "MOGUL L, REGAL 330R" and "MOGUL L, REGAL 300R" all available from Cabot Corp.; "Color Black FW200", "Color Black FW2", "Color Black FW1", "Color Black FW18", "Color Black S170" and "Color Black S160" and "Printex" series such as "Printex 95", "Printex 90", "Printex 85", "Printex 80", "Printex 60", "Printex 55", "Printex 40", "Printex L6" and "Printex P" all available from Degusa AG.; "TOKA BLACK #830/F" available from Tokai Carbon Co., Ltd.; and "MCF88" and "MA600" available from Mitsubishi Chemical Corp.

In view of a good optical density, the carbon blacks have a pH of usually from 2 to 10 and preferably from 4 to 8; a DBP oil absorption of usually from 40 to 130 and preferably from 60 to 130; and an average primary particle size of usually from 8 to 30 nm and preferably from 8 to 20 nm.

The colorant-containing particles may be produced by the following steps (1) and (2) using the below-mentioned water-insoluble polymer:

(1) dispersing a mixture containing the water-insoluble polymer, an organic solvent, colorant and an aqueous medium as well as a neutralizing agent, if required, to obtain a dispersion; and (2) removing the organic solvent from the resultant dispersion.

In the step (1), first, preferably, the water-insoluble polymer is dissolved in the organic solvent, and then the colorant and aqueous medium as well as optional components such as neutralizing agent and surfactant, if required, are added to the organic solvent solution under mixing to obtain a dispersion of an oil-in-water type. The content of the colorant in the mixture is preferably from 5 to 50% by weight. The content of the organic solvent in the mixture is preferably from 10 to 70% by weight. The content of the water-insoluble polymer in the mixture is preferably from 2 to 40% by weight, and the content of the aqueous medium in the mixture is preferably from 10 to 70% by weight. In view of enhancing the optical density, the mixing ratio between the colorant and the water-insoluble polymer is adjusted such that the colorant is preferably used in an amount of from 50 to 900 parts by weight and more preferably from 100 to 800 parts by weight on the basis of 100 parts by weight of the water-insoluble polymer. The order of mixing of the water-insoluble polymer and the colorant is not particularly limited, and these components may be mixed with each other at the same time.

When the water-insoluble polymer contains a salt-forming group, the degree of neutralization of the polymer with the neutralizing agent is not particularly limited. In general, the degree of neutralization is preferably controlled such that the finally obtained water dispersion exhibits a liquid property from weak acidity to weak alkalinity, for example, a pH of from 4.5 to 10. The water-insoluble polymer may be previously neutralized with the neutralizing agent before used in the above step.

Examples of the preferred organic solvents include alcohol solvents, ketone solvents and ether solvents, i.e., the organic solvents are preferably those having a solubility in water of from 10 to 80% by weight as measured at 20° C.

Examples of the alcohol solvents include n-butanol, tertiary butanol, isobutanol and diacetone alcohol. Examples of the ketone solvents include acetone, methyl ethyl ketone, diethyl ketone and methyl isobutyl ketone. Examples of the ether solvents include dibutyl ether and dioxane. Among these solvents, preferred are ketone solvents, and more preferred is methyl ethyl ketone.

Examples of the aqueous medium include those media containing water as a main component, and the aqueous medium may also contain a hydrophilic solvent such as polyhydric alcohols which exhibits a solubility in water of 100% by weight or higher as measured at 20° C.

Examples of the surfactant include anionic surfactants, nonionic surfactants, cationic surfactants and amphoteric surfactants.

As the neutralizing agent, acids or bases may be used according to the kind of the salt-forming group in the water-insoluble polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the water-insoluble polymer is usually from 10 to 200%, preferably from 20 to 150% and more preferably from 50 to 150%.

When the salt-forming group is an anionic group, the degree of neutralization thereof is calculated according to the following formula:

[weight (g) of neutralizing agent]/equivalent of neutralizing agent]/[acid value of polymer (KOH mg/g)×weight (g) of polymer/(56×1000)]×100

When the salt-forming group is a cationic group, the degree of neutralization thereof is calculated according to the following formula:

[weight (g) of neutralizing agent]/equivalent of neutralizing agent]/[amine value of polymer (HCl mg/g)×weight (g) of polymer/(36.5×1000)]×100

The acid value or amine value may be calculated from the respective constitutional units of the water-insoluble vinyl polymer, or may also be determined by the method of subjecting a solution prepared by dissolving the polymer in an appropriate solvent such as methyl ethyl ketone to titration.

The method for dispersing the mixture in the step (1) is not particularly limited. The water-insoluble polymer particles may be finely divided into fine particles having a desired average particle size only by substantial dispersion procedure. Preferably, the mixture is first subjected to preliminary dispersion procedure, and then to the substantial dispersion procedure by applying a shear stress thereto so as to control the average particle size of the water-insoluble polymer particles to a desired value.

Upon subjecting the mixture to the preliminary dispersion procedure, there may be used ordinary mixing or stirring devices such as anchor blades.

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing the particle size of the pigment contained in the mixture.

In the step (2), the organic solvent is removed from the dispersion obtained in the above step (1) by ordinary methods such as distillation under reduced pressure to obtain a water dispersion of the colorant-containing particles. The organic solvent is substantially completely removed from the thus obtained water dispersion of the CB-containing particles. The content of the residual organic solvent in the water dispersion is preferably 0.1% by weight or lower and more preferably 0.01% by weight or lower.

The configuration of the thus obtained colorant-containing particles is not particularly limited as long as the particles are formed from at least the colorant and the water-insoluble polymer. Examples of the configuration of the colorant-containing particles include the particle configuration in which colorant is enclosed in the respective water-insoluble polymer particles, the particle configuration in which colorant is uniformly dispersed in the respective water-insoluble polymer particles, and the particle configuration in which colorant is exposed onto a surface of the respective water-insoluble polymer particles.

The weight ratio between the colorant and the polymer in the colorant-containing particles is controlled such that colorant is preferably present in an amount of from 50 to 900 parts by weight and more preferably from 100 to 800 parts by weight on the basis of 100 parts by weight of the polymer in view of enhancing the optical density.

The average particle size of the colorant-containing particles is preferably from 0.01 to 0.5 µm, more preferably from 0.02 to 0.3 µm and still more preferably from 0.03 to 0.2 µm in view of preventing clogging of nozzles and enhancing the dispersion stability.

The average particle size may be measured using a laser particle analyzing system "ELS-8000" (cumulant analysis) available from Otsuka Denshi Co., Ltd. The measurement is conducted at a temperature of 25° C., an angle between incident light and detector of 90° and a cumulative frequency of 100 times, and a refractive index of water (1.333) is input to the analyzing system as a refractive index of the dispersing medium. The concentration of the dispersion to be measured is usually about $5 \times 10^{-3}$% by weight.

(A-2) Self-Dispersible Pigment

The "self-dispersible pigment" means pigment onto a surface of which at least one anionic or cationic hydrophilic group is bonded either directly or through the other atom group to thereby allow the pigment to be dispersed in an aqueous medium without using a surfactant or a resin. Examples of pigment usable for the self-dispersible pigment include those exemplified above. The self-dispersible pigment is preferably a self-dispersible carbon black in view of a good dispersion stability.

Examples of the other atom group include an alkylene group having 1 to 24 carbon atoms and preferably 1 to 12 carbon atoms, a substituted or unsubstituted phenylene group and a substituted or unsubstituted naphthylene group.

As the anionic hydrophilic group, any optional groups may be used as long as they exhibit a high hydrophilic property sufficient to allow the pigment particles to be stably dispersed in the aqueous medium. Specific examples of the anionic hydrophilic group include a carboxyl group ($-COOM^1$), a sulfonic group ($-SO_3M^1$), a phosphoric group ($-PO_3M^1_2$), $-SO_2NH_2$, $-SO_2NHCOR^1$, and dissociated ions thereof such as $-COO^-$, $-SO_3^-$, $-PO_3^{2-}$ and $-PO_3^-M^1$.

In the above chemical formulas, $M^1$ may be the same or different. Examples of $M^1$ include a hydrogen atom; alkali metals such as lithium, sodium and potassium; an ammonium group; and organic ammonium groups such as monomethyl ammonium, dimethyl ammonium, trimethyl ammonium, monoethyl ammonium, diethyl ammonium, triethyl ammonium, monomethanol ammonium, dimethanol ammonium and trimethanol ammonium.

$R^1$ is an alkyl group having 1 to 12 carbon atoms, a substituted or unsubstituted phenyl group or a substituted or unsubstituted naphthyl group.

Among these anionic hydrophilic groups, preferred are a carboxyl group ($-COOM^1$) and a sulfonic group ($-SO_3M^1$).

Examples of the preferred cationic hydrophilic group include quaternary ammonium groups. Among the quaternary ammonium groups, more preferred are those groups represented by the general formula (1):

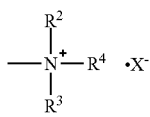

wherein $R^2$, $R^3$ and $R^4$ are each independently a hydrogen atom or $R^1$ as defined above; X is an anionic group obtained by removing a proton from a halogen atom such as fluorine and chlorine, a carboxylic acid such as acetic acid, propionic acid, lactic acid, glycolic acid, gluconic acid and glyceric acid, or an alkyl sulfate having 1 to 8 carbon atoms, as well as those group represented by the following formulae:

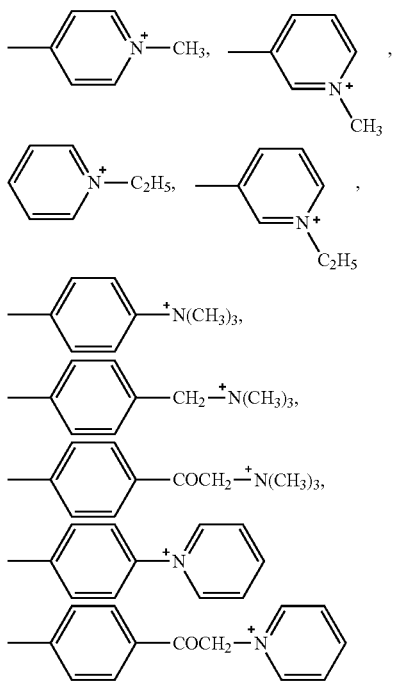

In order to render the pigment self-dispersible, a necessary amount of the above anionic or cationic hydrophilic group may be chemically bonded to a surface of the pigment. The hydrophilic group may be bonded to the surface of the carbon black by any optional known method, for example, by the methods described in U.S. Pat. Nos. 5,571,311, 5,630,868 and 5707432; J. E. Johnson, "Imaging Science and Technology's 50th Annual Conference (1997)"; Yuan Yu, "Imaging Science and Technology's 53rd Annual Conference (2000)"; and "Polyfile", 1248 (1996).

More specifically, there may be used the method of introducing a carboxyl group into carbon black using compounds, e.g., acids having an oxidizing property such as nitric acid, hydrogen peroxide, hypochlorous acid and chromic acid; the method of introducing a sulfone group into carbon black by thermal decomposition of persulfate compounds; and the method of introducing the above anionic hydrophilic groups into carbon black using diazonium compounds containing a carboxyl group, a sulfone group or an amino group, though not limited thereto.

The content of the anionic or cationic hydrophilic group is not particularly limited, and is preferably from 50 to 5,000 µmol/g and more preferably from 100 to 3,000 µmol/g per one gram of the self-dispersible pigment.

The average particle size of the self-dispersible pigment in the water dispersion or the water-based ink is preferably from 50 to 300 nm and more preferably from 60 to 200 nm in view of a good dispersion stability thereof. Meanwhile, the average particle size of the self-dispersible carbon black may be measured under the same conditions as described above using the laser particle analyzing system "ELS-8000" (cumulant analysis) available from Otsuka Denshi Co., Ltd.

Examples of the commercially available anionic self-dispersible carbon blacks include "CAB-O-JET 200" and "CAB-O-JET 300" both available from Cabot Corp., "BON-JET CW-1" and "BONJET CW-2" both available from Orient Chemical Industries Co., Ltd., and "Aqua-Black 162" (carboxyl group content: about 800 µmol/g) available from Tokai Carbon Co., Ltd.

These self-dispersible pigments may be used alone or in combination of any two or more thereof at an optional mixing ratio.

(B) Polymer Particles

In the present invention, the polymer particles are used to enhance a optical density and a high lighter-fastness of the water-based ink by the interrelation with the water-insoluble organic compound.

The "polymer particles" used in the present invention mean such polymer particles capable of being dispersed in a solvent having an aqueous continuous phase in the presence or absence of a surfactant to form a polymer emulsion. Among these polymer particles, in view of a good optical density and a good high lighter-fastness, preferred are (i) self-emulsifiable polymer particles containing a constitutional unit derived from a salt-forming group-containing monomer (hereinafter referred to merely as a "self-emulsifiable polymer (i)" or "self-emulsifiable polymer particles (0")); and (ii) polymer particles obtained by emulsion-polymerizing an ethylenically unsaturated monomer (hereinafter referred to merely as "emulsion polymer (ii)" or "emulsion polymer particles (ii)"), and in view of a good dispersion stability and a good high lighter-fastness, preferred polymer particles are vinyl polymer particles.

Further, in view of enhancing a gloss of the resultant prints, more preferred are self-emulsifiable polymer particles (i). This is because the self-emulsifiable polymer particles suppress coagulation of the self-dispersible pigment.

In addition, in view of exhibiting a more excellent high lighter-fastness, preferred are the polymer particles (ii) obtained by emulsion-polymerizing an ethylenically unsaturated monomer in the presence of a reactive surfactant. This is because the reactive surfactant is hardly desorbed from the polymer particles even when bringing the prints into contact with water-soluble inks such as those used in marker pens, so that the printed images or characters can be prevented from being dissolved out again.

From these viewpoints, the polymer particles (B) are preferably (i) self-emulsifiable polymer particles and/or (ii) polymer particles produced by emulsion-polymerizing an ethylenically unsaturated monomer in the presence of a reactive surfactant.

These polymer particles may be used alone or in the form of a mixture of any two or more thereof.

The constitutional unit of the polymer constituting the polymer particles (B) and the constitutional unit of the polymer constituting the polymer particles (A-1) containing the colorant may be the same or different.

(i) Self-Emulsifiable Polymer Particles

The "self-emulsifiable polymer particles" mean particles of a water-insoluble polymer which is kept in an emulsified state owing to a functional group (in particular, a basic group or a salt thereof) of the polymer itself in the absence of a surfactant (hereinafter referred to merely as a "self-emulsifiable polymer"). Such self-emulsifiable polymer particles may be produced by a method of dissolving or dispersing the polymer in a solvent, directly charging the resultant solution or dispersion into water without adding any surfactant thereto, neutralizing a salt-forming group contained in the polymer, stirring and mixing the resultant mixture containing the neutralized polymer, and then removing the solvent from the mixture to obtain an emulsion thereof.

Here, the "emulsified state" means such a condition in which a stable emulsified or dispersed state of a mixture produced by mixing and stirring a solution prepared by dissolving 30 g of the water-insoluble polymer in 70 g of an organic solvent such as methyl ethyl ketone, a neutralizing agent which is capable of neutralizing 100% of a salt-forming group in the water-insoluble polymer (sodium hydroxide for the anionic salt-forming group or acetic acid for the cationic salt-forming group), and 200 g of water with each other at 25° C. for 30 min, can be confirmed by visual observation even after the mixture is allowed to stand at 25° C. for at least one week.

Water-Insoluble Polymer

The "water-insoluble polymer" means a polymer exhibiting a solubility in water of 10 g or lower, preferably 5 g or lower and more preferably 1 g or lower when the polymer is dried at 105° C. for 2 h, and then dissolved in 100 g of water at 25° C. The solubility means a solubility in water of the water-insoluble polymer whose salt-forming groups are completely (100%) neutralized with sodium hydroxide or acetic acid according to kinds of the salt-forming groups to be neutralized.

The water-insoluble polymer is preferably a water-insoluble vinyl polymer in view of a good dispersion stability and a good high lighter-fastness. More preferred is such a water-insoluble polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") by a solution polymerization method (the mixture of these monomers is hereinafter occasionally referred to merely as a "monomer mixture"). The water-insoluble polymer contains a constitutional unit derived from the component (a), and a constitutional unit derived from the component (b) and/or a constitutional unit derived from the component (c).

The salt-forming group-containing monomer (a) is used for promoting the self-emulsification and enhancing a dispersion stability of the resultant dispersion. Examples of the salt-forming group include a carboxyl group, a sulfonic group, a phosphoric group, an amino group and an ammonium group.

The salt-forming group-containing monomer includes cationic monomers and anionic monomers. Examples of the salt-forming group-containing monomer include those described on page 5, from column 7, line 24 to column 8, line 29 of JP 9-286939A.

Typical examples of the cationic monomers include unsaturated amine group-containing monomers and unsaturated ammonium salt group-containing monomers. Among these cationic monomers, preferred are N,N-dimethylaminoethyl (meth)acrylate, N—(N',N'-dimethylaminopropyl) (meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The macromer (b) is used for enhancing a optical density of the resultant prints and a dispersion stability of the polymer particles. The macromer (b) is in the form of a monomer containing a polymerizable unsaturated group which has a number-average molecular weight of from 500 to 100,000 and preferably from 1,000 to 10,000. The number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the polymer particles, etc., preferred are styrene-based macromers and aromatic group-containing (meth)acrylate-based macromers which have a polymerizable functional group at one terminal end thereof.

Examples of the styrene-based macromer include homopolymers of styrene-based monomers, and copolymers of the styrene-based monomers with other monomers. Examples of the styrene-based monomers (component b-1) include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate (component b-2) include (meth)acrylates containing an arylalkyl group having 7 to 22 carbon atoms, preferably 7 to 18 carbon atoms and more preferably 7 to 12 carbon atoms which may have a substituent group containing a hetero atom, and (meth)acrylates containing an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Specific examples of the aromatic group-containing (meth)acrylate include benzyl(meth)acrylate, phenoxyethyl(meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth)acrylate.

The polymerizable functional group bonded to one terminal end of these macromers is preferably an acryloyloxy group or a methacryloyloxy group. Examples of the preferred other monomers copolymerizable with the aromatic group-containing (meth)acrylate include acrylonitrile.

The content of the constitutional unit derived from the styrene-based monomer in the styrene-based macromer or the constitutional unit derived from the aromatic group-containing (meth)acrylate in the aromatic group-containing (meth)acrylate-based macromer is preferably 50% by weight or higher and more preferably 70% by weight or higher in view of enhancing an affinity to the pigments.

The macromer (b) may further contain a side chain composed of the other constitutional unit derived from an organopolysiloxane, etc. Such a side chain may be produced, for example, by copolymerizing the macromer (b) with a silicone-based macromer having a polymerizable functional group at one terminal end thereof which is represented by the following formula (2):

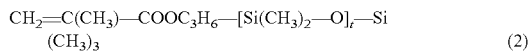  (2)

wherein t is a number from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used for enhancing a optical density and a high lighter-fastness. Examples of the hydrophobic monomer include alkyl (meth)acrylates and aromatic group-containing monomers.

The alkyl(meth)acrylates are preferably those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl (meth)acrylate, cyclohexyl(meth)acrylate, 2-ethylhexyl(meth)acrylate, (iso)octyl(meth)acrylate, (iso)decyl (meth)acrylate, (iso)dodecyl(meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present. and the term "(meth)acrylate" means acrylate, methacrylate or both thereof.

The aromatic group-containing monomer are preferably vinyl monomers containing an aromatic group having 6 to 22 carbon atoms and more preferably 6 to 12 carbon atoms which may contain a substituent group having a hetero atom. Examples of the preferred aromatic group-containing monomer include the above styrene-based monomer (component (b-1)), and the above aromatic group-containing (meth)acrylate (component (b-2)). Examples of the substituent group having a heteroatom are those exemplified above.

Among these components (c), preferred is the styrene-based monomer (b-1), and more preferred are styrene and 2-methyl styrene. The content of the component (b-1) in the component (c) is preferably from 10 to 100% by weight and more preferably from 20 to 80% by weight in view of enhancing the optical density and the high lighter-fastness.

Also, examples of the preferred aromatic group-containing (meth)acrylate as the component b-2 include benzyl(meth)acrylate and phenoxyethyl (meth)acrylate. The content of the component (b-2) in the component (c) is preferably from 10 to 100% by weight and more preferably from 20 to 80% by weight in view of enhancing the optical density and the high lighter-fastness. Further, the components (b-1) and (b-2) are preferably used in combination with each other.

The monomer mixture may further contain (d) a hydroxyl-containing monomer (hereinafter referred to merely as a "component (d)") for enhancing the dispersion stability. The component (d) exhibits an excellent effect of enhancing the dispersion stability of the dispersion and improving the high lighter-fastness for a short period of time upon printing.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the subsequent descriptions) (meth)acrylate, polypropylene glycol (n=2 to 30) (meth)acrylate and poly(ethylene glycol (n=1 to 15)/propylene glycol (n=1 to 15) (meth)acrylate. Among these components (d), preferred are 2-hydroxyethyl(meth)acrylate, polyethylene glycol monomethacrylate and polypropylene glycol methacrylate.

The monomer mixture may further contain (e) a monomer (hereinafter occasionally referred to merely as a "component (e)") represented by the following general formula (3):

  (3)

wherein $R^5$ is a hydrogen atom or a lower alkyl group having 1 to 5 carbon atoms; $R^6$ is a divalent hydrocarbon group having 1 to 30 carbon atoms which may contain a hetero atom; $R^7$ is a monovalent hydrocarbon group having 1 to 30 carbon atoms which may contain a hetero atom; and p represents an average molar number of addition, and is a number from 1 to 60 and preferably a number from 1 to 30.

The component (e) exhibits an excellent effect of enhancing an ejecting property of the resultant water-based ink and preventing occurrence of slippage even upon continuous printing.

In the general formula (3), examples of the hetero atom include a nitrogen atom, an oxygen atom, a halogen atom and a sulfur atom.

Examples of the suitable $R^5$ group include methyl, ethyl and (iso)propyl.

Examples of the suitable $R^{60}$ group include oxymethylene, oxy(iso)propylene, oxytetramethylene, oxyheptamethylene, oxyhexamethylene, and oxyalkylene groups having 2 to 7 carbon atoms which are each constituted from combination of at least two of these groups.

Examples of the suitable $R^7$ group include aliphatic alkyl groups having 1 to 30 carbon atoms and preferably 1 to 20 carbon atoms, aromatic ring-containing alkyl groups having 7 to 30 carbon atoms, and hetero ring-containing alkyl groups having 4 to 30 carbon atoms.

Specific examples of the component (e) include methoxy polyethylene glycol (p in the general formula (3): 1 to 30; this is similarly applied to the subsequent descriptions) (meth)acrylate, methoxy polytetramethylene glycol (p=1 to 30) (meth)acrylate, ethoxy polyethylene glycol (p=1 to 30). (meth)acrylate, octoxy polyethylene glycol (p=1 to 30) (meth)acrylate, polyethylene glycol (p=1 to 30) (meth)acrylate 2-ethylhexyl ether, (iso)propoxy polyethylene glycol (p=1 to 30) (meth)acrylate, butoxy polyethylene glycol (p=1 to 30) (meth)acrylate, methoxy polypropylene glycol (p=1 to 30) (meth)acrylate, and methoxy (ethylene glycol/propylene glycol copolymer) (p=1 to 30: among which the number of ethylene glycol constitutional units is 1 to 29) (meth)acrylate. Among these compounds, preferred are octoxy polyethylene glycol (p=1 to 30) (meth)acrylate and polyethylene glycol (p=1 to 30) (meth)acrylate 2-ethylhexyl ether.

Specific examples of commercially available components (d) and (e) include polyfunctional acrylate monomers (NK Esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300" and "50POEP-800B".

These components (a) to (e) are respectively used alone or in the form of a mixture of any two or more thereof.

Upon production of the water-insoluble polymer, the contents of the above components (a) to (e) in the monomer mixture (contents of non-neutralized components; this definition is similarly applied to the subsequent descriptions) or the contents of constitutional units derived from the components (a) to (e) in the water-insoluble polymer are as follows.

The content of the component (a) is preferably from 5 to 40% by weight, more preferably from 5 to 30% by weight and most preferably from 5 to 20% by weight in view of a good self-emulsifiability of the polymer and a good dispersion stability of the resultant polymer particles.

The content of the component (b) is preferably from 1 to 25% by weight and more preferably from 5 to 20% by weight in view of a good optical density as well as a good dispersion stability of the resultant polymer particles.

The content of the component (c) is preferably from 5 to 79% by weight and more preferably from 10 to 60% by weight in view of a good optical density and a good high lighter-fastness. The components (b) and (c) may be used either in combination or singly in the monomer mixture.

The content of the component (d) is preferably from 5 to 40% by weight and more preferably from 7 to 20% by weight in view of a good dispersion stability of the resultant polymer particles as well as a good high lighter-fastness.

The content of the component (e) is preferably from 5 to 50% by weight and more preferably from 10 to 40% by weight in view of a good dispersion stability of the resultant polymer particles.

The total content of the components (a) and (d) in the monomer mixture is preferably from 6 to 60% by weight and more preferably from 10 to 50% by weight in view of a good dispersion stability of the resultant polymer particles. The total content of the components (a) and (e) in the monomer mixture is preferably from 6 to 75% by weight and more preferably from 13 to 50% by weight in view of a good dispersion stability of the resultant polymer particles. The total content of the components (a), (d) and (e) in the monomer mixture is preferably from 6 to 60% by weight and more preferably from 7 to 50% by weight in view of a good dispersion stability of the resultant polymer particles.

Also, the weight ratio ((a)/[(b)+(c)]) of the component (a) to a sum of the components (b) and (c) is preferably from 0.01 to 1, more preferably from 0.05 to 0.6 and still more preferably from 0.05 to 0.4 in view of a good high lighter-fastness, etc.

Production of Water-Insoluble Polymer

The water-insoluble polymer used in the present invention may be produced by copolymerizing the monomer mixture by known methods such as solution polymerization and bulk polymerization. Among these polymerization methods, preferred is the solution polymerization.

The solvent for the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide. The amount of the radical polymerization initiator to be used is preferably from 0.001 to 5 mol and preferably from 0.01 to 2 mol per 1 mol of the monomer mixture. The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and the polymerization is generally conducted at a temperature of preferably 30 to 100° C. and more preferably 50 to 80° C. The polymerization time is preferably from 1 to 20 h. The polymerization is preferably conducted in an atmosphere of an inert gas such as nitrogen and argon.

After completion of the polymerization, the polymer thus produced is isolated from the reaction solution by a known method such as reprecipitation and removal of solvent by distillation. The thus obtained polymer may be purified by repeated reprecipitation, membrane separation, chromatography, extraction, etc., for removing unreacted monomers, etc.

The weight-average molecular weight of the resultant water-insoluble polymer is preferably from 5,000 to 500,000, more preferably from 10,000 to 400,000 and most preferably from 10,000 to 300,000 in view of a good gloss.

Meanwhile, the weight-average molecular weight of the polymer may be measured by gel chromatography using dimethylformamide containing 60 mmol/L of phosphoric acid and 50 mmol/L of lithium bromide as a solvent and using polystyrene as a standard substance.

(i) Production of Self-Emulsifiable Polymer Particles

The self-emulsifiable polymer particles (i) are preferably produced from the above water-insoluble polymer in the form of a water dispersion thereof through the following steps (1) and (2):

(1) mixing and stirring a mixture containing the water-insoluble polymer, an organic solvent, a neutralizing agent and an aqueous medium; and (2) removing the organic solvent from the resultant mixture.

In the step (1), first, preferably, the water-insoluble polymer is dissolved in the organic solvent, and then mixed with the aqueous medium containing the neutralizing agent under stirring to obtain a dispersion of an oil-in-water type. Thus, by adding the water-insoluble polymer to the aqueous medium containing the neutralizing agent, a water dispersion of the fine self-emulsifiable polymer particles (i) exhibiting a higher storage stability can be produced without applying a strong shear force thereto. The method of mixing and stirring the mixture is not particularly limited.

The organic solvent, the aqueous medium and contents thereof as well as the neutralizing agent and the degree of neutralization of the polymer therewith are the same as described above.

In the step (2), the organic solvent is removed from the dispersion obtained in the above step (1) by known methods such as distillation under reduced pressure to obtain a water dispersion of the self-emulsifiable polymer particles (i). The organic solvent is substantially completely removed from the thus obtained water dispersion. The content of the residual organic solvent in the resultant water dispersion is preferably 0.1% by weight or lower and more preferably 0.01% by weight or lower.

The thus obtained water dispersion of the self-emulsifiable polymer particles (i) has D50 (cumulative 50% value in frequency distribution of scattering intensity when the cumulative percentage is calculated sequentially from smaller particles) of preferably 500 nm or less, more preferably 300 nm or less and most preferably 200 nm or less in view of a good storage stability of the water dispersion. In addition, the lower limit of D50 is preferably 10 nm or more, more preferably 30 nm or more, in view of facilitated production of the water dispersion.

The above water dispersion of the self-emulsifiable polymer particles (i) has D90 (cumulative 90% value in frequency distribution of scattering intensity when the cumulative percentage is calculated sequentially from smaller particles) of preferably 2000 nm or less, more preferably 1000 nm or less and most preferably 500 nm or less in view of reducing a content of coarse particles in the water dispersion and enhancing a storage stability of the water dispersion. In addition, the lower limit of D90 is preferably 20 nm or more, more preferably 50 nm or more, in view of facilitated production of the water dispersion.

Meanwhile, the measurements of D50 and D90 may be conducted using the laser particle analyzing system "ELS-8000" (cumulant analysis) available from Otsuka Denshi Co., Ltd., under the same conditions as described above.

(ii) Emulsion Polymer Particles

The "emulsion polymer particles" mean polymer particles obtained by emulsion-polymerizing an ethylenically unsaturated monomer in the presence of a surfactant and/or a reactive surfactant.

The emulsion polymer is preferably produced by emulsion-polymerizing an ethylenically unsaturated monomer such as the components (a) to (e) in the presence of the reactive surfactant by ordinary methods in view of enhancing a high lighter-fastness of the resultant water-based ink.

The content of constitutional units derived from the components (a) in the emulsion polymer is preferably from 0.3 to 10% by weight, more preferably from 0.5 to 5% by weight and most preferably from 0.5 to 3% by weight in view of a good dispersion stability of the resultant polymer particles.

The content of constitutional units derived from the components (c) in the emulsion polymer is preferably from 50 to 99.5% by weight, more preferably from 60 to 99.5% by weight and most preferably from 70 to 99% by weight in view of a good dispersion stability of the resultant polymer particles.

Also, the weight ratio [(a)/(c)] of the component (a) to the components (c) is preferably from 0.003 to 0.5, more preferably from 0.005 to 0.3 and most preferably from 0.01 to 0.1 in view of a good storage stability, a good optical density, a good high lighter-fastness and a good ejection property of the resultant ink, etc.

In the above polymerization reaction, there may be used any known polymerization initiators. Examples of the polymerization initiators include inorganic peroxides such as hydrogen peroxide, potassium persulfate and ammonium persulfate; organic peroxides such as cumene hydroperoxide, diisopropylbenzene hydroperoxide and p-menthane hydroperoxide; other organic polymerization initiators, e.g., azo-based initiators such as azobisdiisobutyronitrile and methoxybenzene diazomercaptonaphthalene; and redox polymerization initiators using a peroxide or an oxidizing agent in combination with a reducing agent such as sodium hydrogensulfite, sodium thiosulfate, ferrous sulfate and sugar.

The surfactants used in the above emulsion polymerization are not particularly limited, and are preferably anionic surfactants and nonionic surfactants. Examples of the anionic surfactants include sodium dodecylbenzenesulfonate, sodium laurate, and ammonium salts of polyoxyethylene alkyl ether sulfates. Examples of the nonionic surfactants include polyoxyethylene alkyl ethers, polyoxyethylene alkyl esters, polyoxyethylene sorbitan fatty esters, polyoxyethylene alkyl phenyl ethers, polyoxyethylene alkyl amines and polyoxyethylene alkyl amides. These surfactants may be used alone or in the form of a mixture of any two or more thereof.

The reactive surfactant means a surfactant containing one or more radical-polymerizable unsaturated double bonds in a molecule thereof. The reactive surfactant exhibits an excellent emulsifiability for monomers and, therefore, can produce a water dispersion having an excellent stability, resulting in enhanced high lighter-fastness of the resultant water-based ink.

The reactive surfactant is preferably in the form of an anionic or nonionic surfactant containing at least one hydrophobic group such as linear or branched alkyl or alkenyl groups having 8 to 30 carbon atoms and preferably 12 to 22 carbon atoms, and at least one hydrophilic group such as ionic groups and oxyalkylene groups.

Examples of the alkyl groups include octyl, 2-ethylhexyl, decyl, dodecyl, tetradecyl, hexadecyl, octadecyl and behenyl.

Examples of the alkenyl groups include oleyl and octenyl.

Examples of the ionic groups include cationic groups such as ammonium groups and anionic groups. Among these ionic groups, preferred are anionic groups, and more preferred are anionic groups such as a carboxyl group, a sulfonic group, a sulfuric group and a phosphoric group and base-neutralized products thereof. The bases used for neutralizing the anionic groups are the same neutralizing agents as exemplified above.

The oxyalkylene groups preferably contain 1 to 4 carbon atoms, and an average polymerization degree of repeating units thereof is preferably from 1 to 100, more preferably from 4 to 80 and mot preferably from 4 to 50. Among these oxyalkylene groups, preferred are an oxyethylene group and/or an oxypropylene group.

When the surfactant contains two or more kinds of oxyalkylene groups, for example, oxyethylene group and oxypropylene group, these groups may be either block-added, random-added or alternate-added. The terminal end group of the oxyalkylene groups is not particularly limited, and may be a hydroxyl group or an alkoxy group such as methoxy and ethoxy.

The reactive surfactants used in the emulsion polymerization are preferably those surfactant having an anionic group and/or an oxyalkylene group when the resultant emulsion polymer particles contain a constitutional unit derived from anionic monomers, or those surfactants having a cationic group and/or an oxyalkylene group when the resultant emulsion polymer particles contain a constitutional unit derived from cationic monomers, in view of coagulation stability of the polymer particles.

Specific examples of the reactive surfactants include sulfosuccinic ester-based surfactants represented by the following general formulae (4) and (5) such as "LATEMUL S-120P" and "LATEMUL S-180A" both available from Kao Corp., and "ELEMINOL JS-2" available from Sanyo Kasei Kogyo Co., Ltd., and alkyl phenol ether-based surfactants represented by the following general formula (6) such as "AQUALON HS-10" and "AQUALON RN-20" both available from Daiichi Kogyo Seiyaku Co., Ltd.

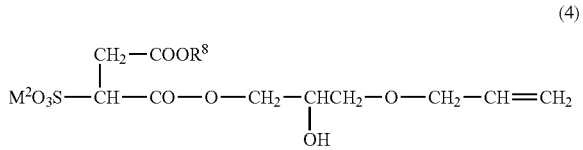

wherein $M^2$ is Na, K or $NH_4$; and $R^8$ is an alkyl group having 8 to 18 carbon atoms.

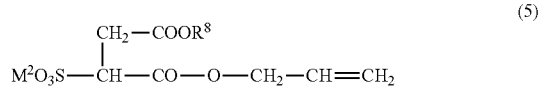

wherein $M^2$ and $R^8$ have the same meaning as defined above.

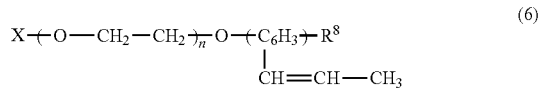

wherein X is H, $SO_3Na$, $SO_3K$ or $SO_3NH_4$; $R^8$ has the same meaning as defined above; and n is an integer of 1 to 200 and preferably 1 to 50.

Among these reactive surfactants, preferred are those containing anionic groups represented by the above general formulae (4) and (5) in view of facilitated operation of the emulsion polymerization. These reactive surfactants may be used alone or in the form of a mixture of any two or more thereof.

The amount of the reactive surfactant used is usually from 0.1 to 10 parts by weight, preferably from 0.1 to 5 parts by weight and more preferably from 0.1 to 3 parts by weight on the basis of 100 parts by weight of the ethylenically unsaturated monomers other than the reactive surfactant. When the amount of the reactive surfactant used is 0.1 part by weight or more, the polymer particles exhibit a good stability, resulting in an enhanced dispersion stability of the polymer particles, whereas when the amount of the reactive surfactant used is 10 parts by weight or less, the resultant ink have a good high lighter-fastness.

Specific examples of the emulsion polymer include (meth) acrylic polymers, vinyl acetate-based polymers, styrene-butadiene-based polymers, vinyl chloride-based polymers, styrene-(meth)acrylic polymers, butadiene-based polymers and styrene-based polymers.

Among these emulsion polymers, preferred are (meth) acrylic polymers, (meth)acrylic-styrene-based polymers and styrene-based polymers, and more preferred (meth)acrylic-styrene-based polymers obtained by copolymerizing a styrene-based monomer with an (meth)acrylic ester.

As monomers used for synthesizing the (meth)acrylic polymers or the (meth)acrylic-styrene-based polymers, there are preferably used (meth)acrylic group-containing monomers among the salt-forming group-containing monomers (a), the hydrophobic monomers (b) and the hydroxyl-containing monomers (d) as exemplified above.

Among these monomers, preferred are (meth)acrylic esters. Examples of the preferred (meth)acrylic esters include the above alkyl(meth)acrylates and the above aromatic group-containing (meth)acrylates. Specific examples of the (meth)acrylic esters include methyl(meth)acrylate, ethyl (meth)acrylate, (iso)propyl(meth)acrylate, (iso- or tertiary-) butyl(meth)acrylate, (iso)amyl (meth)acrylate, cyclohexyl (meth)acrylate, benzyl(meth)acrylate, 2-ethylhexyl (meth) acrylate, (iso)octyl(meth)acrylate, (iso) decyl(meth)acrylate, (iso) do decyl(meth)acrylate, (iso)stearyl(meth)acrylate, 2-hydroxyethyl(meth)acrylate and 3-hydroxypropyl(meth) acrylate.

Examples of the styrene-based monomer for synthesizing the (meth)acrylic-styrene-based polymers and the styrene-based polymers include those exemplified above. Among these monomers, preferred are styrene, vinyl toluene, 2-methyl styrene and chlorostyrene.

When the (meth)acrylic-styrene-based polymers are used as the emulsion polymer, the constitutional unit derived from the salt-forming group-containing monomers such as (meth) acrylic acid is contained therein in an amount of 0.5 to 5% by weight and preferably 0.5 to 3% by weight on the basis of the total weight of the whole monomers used, in order to enhance the stability of the water dispersion of the polymer particles. When the content of the salt-forming group-containing monomers lies within the above-specified range, the viscosity of the emulsion polymerization reaction system is reduced, resulting in simple production of stable polymer particles.

In view of a good dispersion stability of the polymer particles as well as a good high lighter-fastness, the constitutional unit derived from the (meth)acrylic esters is contained therein in an amount of preferably 2 to 95% by weight and more preferably 15 to 80% by weight, and the constitutional unit derived from the styrene-based monomers is contained therein in an amount of preferably 2 to 95% by weight and more preferably 15 to 80% by weight.

When the styrene-based monomer is copolymerized with the (meth)acrylic ester, the weight ratio of [the styrene-based monomer: the (meth)acrylic ester] is preferably from 70:30 to 10:90 and more preferably from 60:40 to 30:70. The solid content in the obtained polymer particles is preferably from 1 to 80% and more preferably from 10 to 70% in view of a good stability and a good formulation property.

(ii) Production of Emulsion Polymer

The emulsion polymer particles used in the present invention may be produced by known emulsion polymerization methods.

In view of enhancing the film-forming property and the high lighter-fastness, the emulsion polymer preferably has a glass transition temperature of 50° C. or lower and preferably 30° C. or lower. Further, the glass transition temperature of the emulsion polymer is preferably −70° C. or higher and more preferably −40° C. or higher in view of enhancing a strength of the resultant coating film as well as the high lighter-fastness.

In the water dispersion and the water-based ink, the D50 value of the water dispersion of the emulsion polymer particles (ii) is not particularly limited as long as the resultant ink is kept stable upon storage thereof. The D50 value of the water dispersion of the emulsion polymer particles (ii) is preferably from 5 to 300 nm and more preferably from 30 to 200 nm as measured at 25° C. using the laser particle analyzing system "ELS-8000" (cumulant analysis) available from Otsuka Denshi Co., Ltd.

Water-Insoluble Organic Compound

It is considered that at least a part of the water-insoluble organic compound used in the present invention is included in the polymer particles (A-1) containing the colorant or the polymer particles (B). Further, it is considered that the polymer particles in which at least a part of the water-insoluble organic compound is included, are enhanced in interaction therebetween, resulting in an improved adhesion of the polymer particles to papers and, therefore, enhanced optical density and high lighter-fastness.

In the present invention, aliphatic acids and derivatives thereof tend to be deteriorated in the above-mentioned effects if they are used as the water-insoluble organic compound (C). Therefore, the aliphatic acids and derivatives thereof are preferably excluded from the scope of the water-insoluble organic compound (C) used in the present invention. In particular, when using the polymer particles (A-1) containing the colorant in the water dispersion or water-based ink, it is preferred that the aliphatic acids and derivatives thereof are not used as the water-insoluble organic compound (C) therein.

The aliphatic acids which are to be excluded from the scope of the water-insoluble organic compound (C) include saturated or unsaturated alkyl carboxylic acids having 8 to 22 carbon atoms. Examples of the aliphatic acids include lauric acid, myristic acid, palmitic acid, oleic acid, stearic acid and behenic acid.

The aliphatic acid derivatives which are to be excluded from the scope of the water-insoluble organic compound (C) include aliphatic acid monoester compounds produced from a monovalent aliphatic acid in the form of a saturated or unsaturated alkyl carboxylic acid and a monovalent alcohol, aliphatic acid amide compounds produced from the above aliphatic acid and ammonia or a lower amine having 3 or less carbon atoms, and aliphatic acid anhydrides derived from the above aliphatic acid. More specifically, the above aliphatic acid esters include ester compounds produced from a saturated or unsaturated alkyl carboxylic acid having 8 to 22 carbon atoms, and an alcohol. Examples of the aliphatic acid esters include isotridecyl myristate, methyl stearate, methyl oleate, methyl palmitate and methyl behenate. Examples of the aliphatic acid amides include oleamide and stearamide. Examples of the aliphatic acid anhydrides include oleic anhydride. However, these compounds may be contained in the water dispersion of the present invention as long as the object of the present invention is not adversely affected.

The water-insoluble organic compound preferably has a molecular weight of from 100 to 2,000 and more preferably from 100 to 1,000 in view of enhancing a optical density and a high lighter-fastness of the resultant ink.

The solubility of the water-insoluble organic compound in water is 5 g or lower, preferably 3 g or lower and more preferably 1 g or lower per 100 g of water as measured at 20° C.

The water-insoluble organic compound preferably has a Log P value of from −1 to 11, more preferably from 1 to 9, still more preferably from 1.5 to 8 and most preferably from 2 to 7 for enhancing a flexibility of the polymer.

In addition, in view of a good interaction between the water-insoluble organic compound and the polymer particles, the value obtained by subtracting the Log P value of the polymer of the polymer particles (B) from the Log P value of the water-insoluble organic compound (C) is preferably from −4 to 8, more preferably from −2 to 6, still more preferably from −1.5 to 5 and most preferably from −1 to 4.

Here, the "Log value" means a logarithm of a 1-octanol/water partition coefficient of the water-insoluble organic compound, and is expressed by a numerical value calculated according to fragment approach using SRC's LOGKOW/KOWWIN Program of KowWin (Syracuso Research Corporation, USA) (The KowWin Program methodology is described in the following journal article: Meylan, W. M. and P. H. Howard, 1995, "Atom/fragment contribution method for estimating octanol-water partition coefficients", J. Parm. Sci., 84, pp. 83-92). The fragment approach is conducted on the basis of a chemical structure of compounds in which the number of atoms and the type of chemical bonds are taken into consideration. The Log P value is in general a numerical value which is used for relative evaluation of hydrophilic and hydrophobic properties of organic compounds.

The water-insoluble organic compound is preferably in the form of an ester compound, an ether compound or a sulfonamide compound for facilitating inclusion of the water-insoluble organic compound in the polymer particles. The water-insoluble organic compound is more preferably an ester or ether compound (f) containing two or more ester or ether bonds in a molecule thereof, and/or an ester or ether compound (g) containing one or more ester or ether bonds and at least one functional group selected from the group consisting of a carboxyl group, a sulfonic group, a phosphoric acid residue, a carbonyl group, an epoxy group and a hydroxyl group in a molecule thereof. The number of the ester or ether bonds in the compound (f) is preferably from 2 to 3; the number of the ester or ether bonds in the compound (g) is preferably from 1 to 3, and the number of the functional groups in the compound (g) is preferably from 1 to 3.

Meanwhile, the phosphoric acid residue means a phosphoric group as a remaining part of a phosphoric acid ester or ether which is obtained by excluding the esterified or etherified moiety therefrom.

Among these ester or ether compounds, preferred are esters produced from a monovalent carboxylic acid or a salt thereof, and a polyvalent alcohol; esters produced from a polyvalent acid such as polycarboxylic acid and phosphoric acid or a salt thereof, and a monovalent alcohol; and ethers of polyvalent alcohols, and more preferred are those compounds having two aliphatic or aromatic carboxylic ester groups or three phosphoric ester groups. Examples of the salt include alkali metal salts, alkanol amine salts and ammonium salts.

Examples of the monovalent carboxylic acid include linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, branched aliphatic carboxylic acids such as pivalic acid, and unsaturated aliphatic carboxylic acids such as acrylic acid and methacrylic acid; and aromatic carboxylic acids having 6 to 12 carbon atoms such as benzoic acid. Examples of the polyvalent acid include aliphatic carboxylic acids having 2 to 12 carbon atoms such as maleic acid, fumaric acid, itaconic acid, succinic acid, adipic acid and sebacic acid; aromatic carboxylic acids having 6 to 12 carbon atoms such as phthalic acid and trimellitic acid; and phosphoric acids.

Examples of the monovalent alcohol include linear or branched aliphatic alcohols having 1 to 18 carbon atoms and preferably 2 to 10 carbon atoms such as ethyl alcohol, butyl alcohol, hexyl alcohol, octyl alcohol, decyl alcohol and dodecyl alcohol; and aromatic alcohols having 6 to 12 carbon atoms such as phenol. Examples of the polyvalent alcohol include those having 2 to 12 carbon atoms such as ethylene glycol, diethylene glycol, neopentyl glycol, trimethylol propane, pentaerythritol and glycerol. The aliphatic acids and alcohols used in the present invention may be either saturated or unsaturated.

Specific examples of the water-insoluble organic compound include (1) aliphatic carboxylic esters, (2) aromatic carboxylic esters, (3) phosphoric esters, (4) cycloalkane (cycloalkene) carboxylic esters, (5) oxyacid esters, (6) glycol esters, (7) epoxy-based esters, (8) sulfonamides, (9) polyesters, (10) glyceryl alkyl ethers, (11) glyceryl alkyl esters, (12) glycol alkyl ethers, (13) glycol alkyl esters, (14) ethers or esters of trimethylol propane, and (15) ethers or esters of pentaerythritol.

Among these compounds, in view of a good optical density and a good high lighter-fastness, preferred are the compounds (1), (3), (5), (8) and (10), more preferred is at least one compound selected from the group consisting of (1) aliphatic di- or tri-carboxylic esters, (3) phosphoric esters and (10) glyceryl alkyl ethers.

The aliphatic dicarboxylic esters (1) are preferably compounds represented by the following general formula (7):

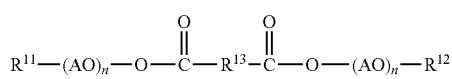

(7)

wherein $R^{11}$ and $R^{12}$ are respectively a hydrogen atom, a linear, branched or cyclic hydrocarbon group having 1 to 18 carbon atoms, an aralkyl group having 7 to 22 carbon atoms, an aryl group having 6 to 22 carbon atoms or a glycol ether group having 2 to 10 carbon atoms, and $R^{11}$ and $R^{12}$ may be the same or different; $R^{13}$ is a divalent aliphatic hydrocarbon group having 1 to 18 carbon atoms which may have an unsaturated group; $R^{11}$ to $R^{13}$ may have a substituent group; n represents an average molar number of addition, and is a number from 0 to 20; and AO is an alkyleneoxy group.

$R^{11}$ and $R^{12}$ are preferably a linear or branched alkyl or alkenyl group having preferably 2 to 18 carbon atoms and more preferably 4 to 12 carbon atoms in view of enhancing a gloss and an image clarity of the resultant prints. Specific examples of the alkyl or alkenyl group include methyl, ethyl, propyl, isopropyl, butyl, hexyl, 2-ethylhexyl, octyl, dodecyl and cetyl. The definitions of $R^{11}$ and $R^{12}$ are similarly applied to the below-mentioned formulae.

$R^{13}$ is preferably an alkylene group or an alkenylene group. Specific examples of the alkylene group or the alkenylene group include an ethylene group, a propylene group, a trimethylene group, a butylene group, a hexylene group, a 2-ethylhexylene group, an octylene group and a dodecylene group. Among these alkylene or alkenylene groups, preferred are alkylene groups having 2 to 15 carbon atoms, more preferred are alkylene groups having 2 to 12 carbon atoms, and most preferred are alkylene groups having 2 to 8 carbon atoms. The definition of $R^{13}$ is similarly applied to the below-mentioned formulae.

Th symbol n is a number of preferably from 0 to 15, more preferably from 0 to 12 and most preferably from 2 to 10.

AO is an alkyleneoxy group having 2 to 4 carbon atoms such as an ethyleneoxy (EO) group, a propyleneoxy (PO) group and a butyleneoxy (BO) group, and when n is 2 or more, a plurality of AO groups may be the same or different. When a plurality of AO groups are different from each other, the respective AO groups may be either block-added or random-added.

Examples of the substituent group which may be bonded to $R^{11}$ to $R^{13}$ include a halogen atom such as fluorine, chlorine and bromine; an alkyl group having 1 to 12 carbon atoms such as methyl, ethyl, propyl, isopropyl, isobutyl, t-butyl, hexyl and lauryl; a cycloalkyl group such as cyclohexyl; an aryl group such as phenyl; an alkoxy group having 1 to 12 carbon atoms such as methoxy, ethoxy and isopropoxy; an aryloxy group such as phenyloxy; an alkoxycarbonyl group such as methoxycarbonyl; an acyl group such as acetyl and benzoyl; an acyloxy group such as acetyloxy; a cyano group; a nitro group; a hydroxyl group; a carboxyl group; an oxo group; an epoxy group; an ether group and an ester group. These substituent groups may be bonded to $R^{11}$ to $R^{13}$ alone or in combination of any two or more thereof.

Specific examples of the aliphatic dicarboxylic ester (1) include aliphatic dibasic acid esters such as dimethyl adipate, diethyl adipate, dibutyl adipate, diisobutyl adipate, bis(2-ethylhexyl) adipate, diisononyl adipate, diisodecyl adipate, bis(butyl diethylene glycol) adipate, dimethyl sebacate, diethyl sebacate, dibutyl sebacate, bis(2-ethylhexyl) sebacate, diethyl succinate and bis(2-ethylhexyl) azelate. Among these esters, especially preferred are diesters of aliphatic dibasic acids having 6 to 10 carbon atoms such as diethyl adipate, dibutyl adipate, diisobutyl adipate, bis(butyl diethylene glycol) adipate, bis(octoxy polyethylene glycol) adipate ($R^{11}$ and $R^{12}$ are both 2-ethylhexyl; AO=EO; average molar number of addition (n): 4, 6 or 8), diethyl sebacate, dibutyl sebacate and diisobutyl sebacate. Examples of the aliphatic tricarboxylic ester include esters of citric acid.

The aromatic carboxylic esters (2) are preferably di- or tri-carboxylic esters represented by the following general formula (8):

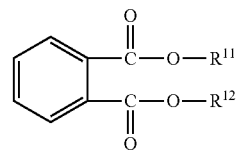

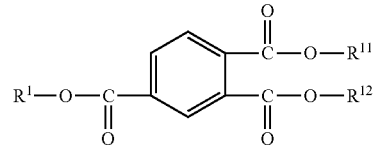

(8)

wherein $R^{11}$ and $R^{12}$ have the same meaning as defined above, and $R^{11}$ and $R^{12}$ may be the same or different.

Specific examples of the aromatic carboxylic esters (2) include phthalic esters such as dimethyl phthalate, diethyl phthalate, di-n-butyl phthalate, diisobutyl phthalate, bis(2-ethylhexyl) phthalate, di-n-octyl phthalate, diisodecyl phthalate, butylbenzyl phthalate, octylbenzyl phthalate, nonylbenzyl phthalate, stearylbenzyl phthalate, octyldecyl phthalate, dicylcohexyl phthalate, diphenyl phthalate, bis(dimethylcyclohexyl)phthalate, bis(t-butylcyclohexyl)phthalate and ethylphthalylethyl glycolate; and trimellitic esters such as dibutyl trimellitate, diisobutyl trimellitate and tris(2-ethylhexyl) trimellitate. Among these aromatic carboxylic esters, preferred are phthalic diesters containing an aliphatic alcohol residue having 1 to 5 carbon atoms such as dimethyl phthalate, diethyl phthalate, di-n-butyl phthalate and diisobutyl phthalate; benzyl phthalates containing an alkyl group having 3 to 18 carbon atoms such as octylbenzyl phthalate and stearylbenzyl phthalate; and trimellitic diesters containing an aliphatic alcohol residue having 3 to 5 carbon atoms such as dibutyl trimellitate and diisobutyl trimellitate. The aromatic carboxylic esters are preferably in the form of an aromatic di- or tri-carboxylic ester.

The phosphoric esters (3) are preferably compounds represented by the following general formula (9);

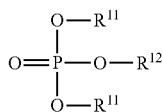

wherein $R^{11}$ and $R^{12}$ have the same meaning as defined above, and $R^{11}$ and $R^{12}$ may be the same or different.

Specific examples of the phosphoric esters (3) include tributyl phosphate, tris(2-ethylhexyl) phosphate, tris(butoxyethyl) phosphate, triphenyl phosphate, tricresyl phosphate, trixylenyl phosphate, cresyldiphenyl phosphate and 2-ethylhexyl diphenyl phosphate. Among these phosphoric esters, preferred are phosphoric esters containing an alkoxyalkyl group having 5 to 9 carbon atoms such as tris(butoxyethyl) phosphate; phosphoric esters containing an aliphatic hydrocarbon group having 4 to 12 carbon atoms such as tributyl phosphate; and phosphoric esters containing an aromatic hydrocarbon group having 7 to 12 carbon atoms such as tris(butoxyethyl) phosphate, tricresyl phosphate, trixylenyl phosphate and cresyldiphenyl phosphate. The phosphoric esters are preferably in the form of a phosphoric di- or tri-ester.

The cycloalkane (cycloalkene) carboxylic esters (4) are those esters containing a cyclic hydrocarbon group having 3 to 8 carbon atoms which may have one unsaturated group, and are preferably cyclohexane (cyclohexene) dicarboxylic esters represented by the following general formula (10);

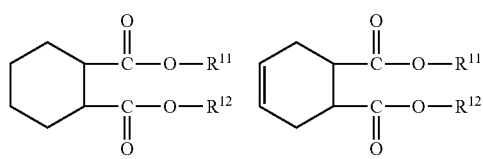

wherein $R^{11}$ and $R^{12}$ have the same meaning as defined above, and $R^{11}$ and $R^{12}$ may be the same or different.

Specific examples of the cycloalkane (cycloalkene) carboxylic esters (4) include cyclohexane esters such as dibutyl 1,2-cyclohexanedicarboxylate and diisononyl 1,2-cyclohexanedicarboxylate; and cyclohexene esters such as dibutyl 3,4-cyclohexenedicarboxylate and diisononyl 3,4-cyclohexenedicarboxylate.

The oxyacid esters (5) are preferably compounds represented by the following general formula (11):

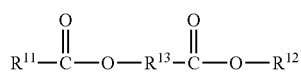

wherein $R^{11}$, $R^{12}$ and $R^{13}$ have the same meaning as defined above, and $R^{11}$ and $R^{12}$ may be the same or different.

Specific examples of the oxyacid esters (5) include triethyl acetylcitrate, tributyl acetylcitrate and methyl acetylricinoleate.

The glycol esters (6) are preferably compounds represented by the following general formula (12);

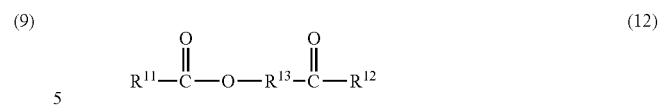

wherein $R^{11}$, $R^{12}$ and $R^{13}$ have the same meaning as defined above, and $R^{11}$ and $R^{12}$ may be the same or different.

Specific examples of the glycol esters (6) include diethylene glycol dibenzoate and triethylene glycol di(2-ethyl hexoate).

The epoxy-based esters (7) are preferably compounds represented by the following general formula (13):

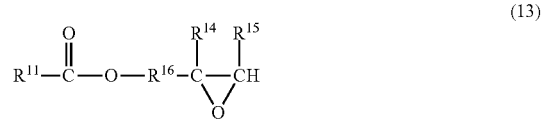

wherein $R^{11}$ has the same meaning as defined above, and $R^{14}$ and $R^{15}$ are each independently a hydrogen atom or a lower alkyl group having 1 to 5 carbon atoms; and $R^{16}$ is an alkylene group having 1 to 6 carbon atoms.

Specific examples of the epoxy-based esters (7) include butyl epoxystearate and octyl epoxystearate.

The sulfonamides (8) are preferably compounds represented by the following general formula (14);

wherein $R^{11}$ and $R^{12}$ have the same meaning as defined above, and $R^{11}$ and $R^{12}$ may be the same or different.

Specific examples of the sulfonamides (8) include o- and p-toluene sulfonamides and N-butylbenzene sulfonamide.

The polyesters (9) are preferably compounds represented by the following general formula (15):

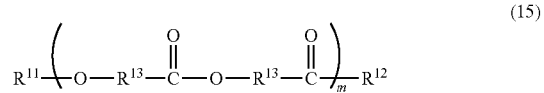

wherein $R^{11}$, $R^{12}$ and $R^{13}$ have the same meaning as defined above, and $R^{11}$ and $R^{12}$ may be the same or different, and a plurality of $R^3$ groups may be the same or different; and m is a number from 1 to 18 and preferably from 1 to 10.

Specific examples of the polyesters (9) include poly(1,2-butanediol adipate) and poly(1,3-butanediol adipate).

Specific examples of the glyceryl alkyl ethers (10) include glyceryl monoethers, glyceryl diethers and glyceryl triethers. Among these glyceryl alkyl ethers, preferred are glyceryl monoethers containing a linear or branched alkyl group having 8 to 30 carbon atoms. The alkyl group have 8 to 30 carbon atoms, preferably 8 to 22 carbon atoms and more preferably 8 to 14 carbon atoms.

Examples of the alkyl group include 2-ethylhexyl, (iso) octyl, (iso)decyl, (iso)dodecyl, (iso)myristyl, (iso)cetyl, (iso) stearyl and (iso)behenyl.

The bonding position of the alkyl group in the glyceryl alkyl ethers is not particularly limited, and the glyceryl alkyl ethers may be in the form of a 1-alkyl glyceryl monoether or a 2-alkyl glyceryl monoether.

Specific examples of the glyceryl alkyl esters (11) include glyceryl monoalkyl esters, glyceryl dialkyl esters and glyceryl trialkyl esters.

Among these glyceryl alkyl esters, preferred are glyceryl alkyl esters of linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, and branched aliphatic carboxylic acids such as pivalic acid. The total number of carbon atoms in the alkyl group is preferably 6 or more and more preferably 8 or more.

Further specific examples of the glyceryl alkyl esters (11) include glyceryl triacetate, glyceryl diacetate and glyceryl monoacetate.

Specific examples of the glycol alkyl ethers (12) include glycol monoalkyl ethers and glycol dialkyl ethers.

Specific examples of the glycol alkyl esters (13) include glycol monoalkyl esters and glycol dialkyl esters.

Examples of the glycol contained in the compounds (12) and (13) include ethylene glycol and neopentyl glycol. Examples of the alkyl group contained in the compounds (12) and (13) include a linear or branched alkyl group having 1 to 22 carbon atoms. The total number of carbon atoms in the alkyl group is preferably 6 or more and more preferably 8 or more.

The above water-insoluble organic compounds (1) to (15) may be used alone or in the form of a mixture of any two or more thereof.

Water Dispersion and Water-Based Ink for Ink-Jet Printing

The water dispersion of the present invention is produced by mixing at least one material selected from the group consisting of the above polymer particles (A-1) containing the colorant and the self-dispersible pigment (A-2), with the polymer particles (B) and the water-insoluble organic compound (C).

The order of mixing of the respective components is not particularly limited. The mixing temperature is preferably from about 5 to 50° C. The components (A-1) and (A-2) may be used in combination of two or more kinds thereof at the same time.

The water-based ink of the present invention is an ink containing the water dispersion of the present invention and using water as a main solvent. The water-based ink may further contain various additives such as wetting agents, dispersants, defoaming agents, mildew-proof agents and chelating agents, if required. The mixing method of these respective components is not particularly limited.

The contents of the colorant, the polymer particles (A-1) containing the colorant, the self-dispersible pigment (A-2), the polymer particles (B), the water-insoluble organic compound (C) and water in the water dispersion and the water-based ink for ink-jet printing are as follows.

The content of the colorant is preferably from 0.5 to 18% by weight, more preferably from 1 to 10% by weight and most preferably from 2 to 8% by weight in view of a good optical density and a good high lighter-fastness.

The content of the polymer particles (A-1) (solid content) containing the colorant is preferably from 1 to 20% by weight, more preferably from 2 to 13% by weight and most preferably from 3 to 10% by weight in view of a good optical density and a good high lighter-fastness.

The content of the self-dispersible pigment (A-2) is preferably from 1 to 20% by weight, more preferably from 2 to 13% by weight and most preferably from 3 to 10% by weight in view of a good optical density and a good high lighter-fastness.

The content of the polymer particles (B) is preferably from 0.5 to 15% by weight, more preferably from 1 to 10% by weight and most preferably from 2 to 8% by weight in view of a good high lighter-fastness and a high optical density.

In view of a good high lighter-fastness and a high optical density, the lower limit of the content of the water-insoluble organic compound (C) is preferably 0.11% by weight or more, more preferably 0.4% by weight or more, still more preferably 0.6% by weight or more, further still more preferably 0.7% by weight, further still more preferably 0.8% by weight and most preferably 1% by weight or more, and the upper limit is preferably 10% by weight or less, more preferably 5% by weight or less, still more preferably 3% by weight or less and most preferably 2% by weight or less. From these viewpoints, the content of the water-insoluble organic compound (C) is preferably 0.11 to 10% by weight, more preferably from 0.4 to 10% by weight, still more preferably from 0.6 to 5% by weight, further still more preferably from 0.7 to 5% by weight, further still more preferably from 0.8 to 3% by weight and most preferably from 1 to 2% by weight.

The content of water is preferably from 30 to 90% by weight and more preferably from 40 to 80% by weight.

The mixing ratio between the polymer particles (A-1) (solid content) containing the colorant or the self-dispersible pigment (A-2) and the water-insoluble organic compound (C) is adjusted such that the water-insoluble organic compound (C) is used in an amount of preferably from 1 to 100 parts by weight, more preferably from 3 to 50 parts by weight and most preferably from 3 to 20 parts by weight on the basis of 100 parts by weight of the polymer particles (A-1) (solid content) containing the colorant or the self-dispersible pigment (A-2) in view of a high optical density and a good high lighter-fastness.

The weight ratio between the polymer particles (A-1) (solid content) containing the colorant or the self-dispersible pigment (A-2) and the polymer particles (B) is adjusted such that the polymer particles (A-1) (solid content) containing the colorant and the self-dispersible pigment (A-2) are respectively used in an amount of from 50 to 900 parts by weight and more preferably from 100 to 800 parts by weight on the basis of 100 parts by weight of the polymer particles (B) in view of a high optical density and a good high lighter-fastness.

When both of the components (A-1) and (A-2) are used in the form of a mixture thereof, the above-specified ratios are calculated on the basis of the total amount thereof.

The weight ratio [(B)/(C)] of the polymer particles (B) to the water-insoluble organic compound (C) is preferably from 15/1 to 1/2, more preferably from 6/1 to 1/1 and most preferably from 4/1 to 2/1 in view of a high optical density and a good high lighter-fastness.

The surface tension of the water dispersion of the present invention is preferably from 30 to 70 mN/m and more preferably from 35 to 68 mN/m as measured at 20° C., and the surface tension of the water-based ink of the present invention is preferably from 25 to 50 mN/m and more preferably from 27 to 45 mN/m as measured at 20° C.

The viscosity of the water dispersion having a solid content of 10 wt % is preferably from 2 to 6 mPa·s and more preferably from 2 to 5 mPa·s as measured at 20° C. to produce a water-based ink having a suitable viscosity. The viscosity of the water-based ink is preferably from 2 to 12 mPa·s and more preferably from 2.5 to 10 mPa·s in order to maintain a good ejection property thereof. In addition, the pH of the water-based ink of the present invention is preferably from 4 to 10.

The water-based ink of the present invention is suitably applicable to be used for ink-jet printing on ordinary paper because printing images or characters on ordinary paper needs more performance of optical density and high-lighter fastness.

The water-based ink of the present invention is suitably applicable to a piezoelectric type ink-jet printer, though not particularly limited thereto.

EXAMPLES

In the following production examples, examples and comparative examples, the "part(s)" and "%" indicate "part(s) by weight" and "% by weight", respectively, unless otherwise specified.

Production Example 1

Production of Polymer Particles Containing an Colorant (A-1)

Twenty parts of methyl ethyl ketone and 0.03 part of a chain transfer agent (2-mercaptoethanol) together with 10% of 200 parts of a monomer mixture containing methacrylic acid (a)/a styrene macromer (b) (tradename "AS-6" available from Toagosei Co., Ltd./styrene (c)/polyethylene glycol methacrylate 2-ethylhexyl ether (e) ("NK Ester EH-4G" available from Shin-Nakamura Kagaku Co., Ltd. average molar number of addition of ethyleneoxide: 4) at a mixing weight ratio of 14/15/56/25 were charged into a reaction vessel and mixed with each other, and then the reaction vessel was fully purged with a nitrogen gas to thereby obtain a mixed solution.

Separately, remaining 90% of the monomer mixture was charged into a dropping funnel, and further 0.27 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping, a solution prepared by dissolving 0.3 part by weight of the radical polymerization initiator in 5 parts of methyl ethyl ketone was added to the obtained reaction solution, and the resultant solution was further aged at 65° C. for 2 h and further at 70° C. for 2 h to obtain a polymer solution. Next, the thus obtained polymer solution was mixed with a given amount of methyl ethyl ketone under stirring to obtain a polymer solution having a effective content of 50%. As a result, it was confirmed that the weight-average molecular weight of the thus obtained polymer was about 150,000.

Into 30 parts of the thus obtained polymer solution, were added 60 parts of carbon black (tradename "Monarch 880" available from Cabot Corp.), 4.3 parts of a 5 mol/L sodium hydroxide solution, 1.2 parts of a 25% ammonia aqueous solution, 70 parts of methyl ethyl ketone and 230 parts of ion-exchanged water, and the obtained mixture was stirred at 20° C. for 1 h using disper blades. The thus obtained mixture was dispersed under a pressure of 150 MPa by passing through a dispersing apparatus "MICROFLUIDIZER" (tradename) available from Microfluidics Corp., 10 times.

The resultant kneaded material was further mixed with 100 parts of ion-exchanged water, and then methyl ethyl ketone was removed from the resultant mixture under reduced pressure at 60° C., followed by removing a part of water therefrom. The obtained mixture was filtered through a 5 μm-mesh filter (acetyl cellulose membrane; available from Fuji Photo Film Co., Ltd.) to remove coarse particles therefrom, thereby obtaining a water dispersion of pigment-containing particles having a solid content of 20% by weight.

As a result, it was confirmed that the obtained pigment-containing particles had D50 of 115 nm. Meanwhile, the measurement of D50 was performed at 25° C. using a laser particle analyzing system "ELS-8000" (product number) available from Otsuka Denshi Co., Ltd.

Production Example 2

Production of (B) Polymer Particles (B-1)

(Self-Emulsifiable Polymer Particles)

Thirty parts of the polymer solution obtained in Production Example 1 was mixed with 40 parts of methyl ethyl ketone and 30 parts of acetone under stirring to prepare a uniform solution. The thus obtained solution was charged into a dropping funnel, and dropped into a reaction vessel filled with a mixture previously prepared by mixing 4.3 parts of a 5 mol/L sodium hydroxide aqueous solution, 1.2 parts of a 25% ammonia aqueous solution and 217.5 parts of ion-exchanged water with each other, over 30 min to neutralize the polymer solution. Further, the mixture was stirred for 30 min to obtain an emulsion composition. The thus obtained emulsion composition was heated at 60° C. under reduced pressure to remove the organic solvent and ammonia together with a part of water therefrom. The composition was further passed through a filter having an average pore size of 5 μm (available from Nippon Pole Co., Ltd.) to remove coarse particles therefrom, thereby obtaining a water dispersion containing the polymer particles (B-1) in an amount of 20% as a solid content (effective content). As a result of conducting the same measurement as in Production Example 1, it was confirmed that the thus obtained polymer particles (B-1) had D50 of 105 nm.

The weight-average molecular weight and the Log P value of the monomer (Mw; Log P value): methacrylic acid (86; 0.99)/a styrene macromer (6000; 165.72)/styrene (104; 2.89)/polyethylene glycol methacrylate 2-ethylhexyl ether (374; 3.56)

The Log P value of the polymer of the polymer particles: 3.08

Production Example 3

Production of (B) Polymer Particles (B-2) (Emulsion Polymer Particles)

A glass reactor equipped with a stirrer, a thermometer, a reflux condenser and a nitrogen feed tube was charged with 1000 g of ion-exchanged water, 62 g of polyoxyethylene alkyl ether sodium sulfate as a surfactant (product name "LATEMUL E-118B" available from Kao Corporation; effective ingredient content: 26%) and 2.4 g of potassium persulfate, purged with nitrogen, and then placed in a water bath to heat the contents of the reactor to 70° C. Next, 800 g of a monomer mixture containing acrylic acid (a)/styrene (c)/methyl methacrylate (c)/butyl acrylate (c) at a mixing weight ratio of 2/15/34/49 was dropped into the reactor over 2 h, and then the contents of the reactor were aged at 80° C. for 2 h, thereby obtaining polymer particles (B-2) having a solid content (effective content) of 48%. As a result of conducting the same measurement as in Production Example 1, it was confirmed that the thus obtained polymer particles (B-2) had D50 of 120 nm.

The weight-average molecular weight and the Log P value of the monomer (Mw; Log P value): acrylic acid (72; 0.44)/styrene (104; 2.89)/methyl methacrylate (100; 1.28)/butyl acrylate (128; 2.20)

The Log P value of the polymer of the polymer particles: 1.91

Production Example 4

Production of (B) Polymer Particles (B-3) (Emulsion Polymer Particles Using Reactive Surfactant)

The same procedure as in Production Example 2 was repeated except for using 32 parts of a reactive surfactant "LATEMUL S-180A" (available from Kao Corporation; effective ingredient content: 50%) in place of polyoxyethylene alkyl ether sodium sulfate (product name "LATEMUL E-118B" available from Kao Corporation; effective ingredient content: 26%), thereby obtaining polymer particles (B-3) having a solid content (effective content) of 47%. As a result of conducting the same measurement as in Production Example 1, it was confirmed that the thus obtained polymer particles (B-3) had D50 of 98 nm.

Examples 1 to 9 and Comparative Examples 1 to 5

An aqueous solution of a self-dispersible carbon black (CW-2 or CAB shown in Table 1), the pigment-containing particles obtained in Production Example 1, a water dispersion containing the polymer particles (B-1 to B-3) obtained in Production Examples 2 to 4 (solid content: 20%), dibutyl adipate (Log P value: 4.33), tributyl phosphate (Log P value: 3.82), 5 parts of glycerol, 5 parts of 2-pyrrolidone, 2 parts of isopropyl alcohol, 1 part of "ACETYLENOL EH" available from Kawaken Fine Chemicals Co., Ltd., and water were prepared and mixed with each other under stirring at 25° C. to obtain a dispersion having an ink composition as shown in Table 1. The thus obtained dispersion was filtered through a 1.2 μm-mesh filter to obtain a water-based ink.

The thus obtained water-based ink was evaluated with respect to (1) optical density and (2) high lighter-fastness by the following methods. The results are shown in Table 1.

Meanwhile, "CW-2", "CAB" and "Other Components" used in Table 1 respectively represent the following s.

"CW-2": "BONJET CW-2" (tradename) available from Orient Kagaku Kogyo Co., Ltd.; solid content: 15%; average particle size: 160 nm "CAB": "CAB-O-JET 300" (tradename) available from Cabot Corp.; solid content: 15%

"Other Components": 5 parts of glycerol, 5 parts of 2-pyrrolidone, 2 parts of isopropyl alcohol, and 1 part of "ACETYLENOL EH" available from Kawaken Fine Chemicals Co., Ltd.

(1) Optical Density

Solid image printing was carried out on a recycled paper for PPC available from Nippon Kakoseisi Co., Ltd., using an ink-jet printer "Model EM930C" (piezoelectric type) available from Seiko Epson Co., Ltd. The thus printed paper was naturally dried at room temperature for 24 h, and then the optical density thereof was measured by a Macbeth densitometer "RD914" (product number) available from Gretag-Macbeth Corp. The results of the measurement were evaluated according to the following evaluation criteria.

[Evaluation Criteria]
○: optical density: 1.40 or more
Δ: optical density: not less than 1.36 but less than 1.40
x: optical density: less than 1.36

(2) High Lighter-Fastness

Text printing was carried out on a recycled PPC paper commercially available from Nippon Kakoseisi Co., Ltd., using the above-mentioned printer, and after passage of 3 min and 10 min, the extent of staining of the printed sample when traced with an aqueous fluorescent marker "OPTEX 1" (tradename) commercially available from Zebra Co., Ltd., was observed with naked eyes, and the evaluation was made on the basis of the following evaluation criteria.

[Evaluation Criteria]
◎: No staining such as rubbed stains was observed when traced with a fluorescent marker.
○: Some rubbed stains were generated when traced with a fluorescent marker, but at a level without practical problems.
Δ: Generation of rubbed stains were observed when traced with a fluorescent marker.
x: Generation of rubbed stains were remarkably observed over a whole surface traced with a fluorescent marker, which is intolerable.

TABLE 1

| | Ink composition | | | | | |
|---|---|---|---|---|---|---|
| | Component (A) | | Polymer particles (B) | | | |
| | Self-dispersible carbon black | colorant-containing particles | B-1 | B-2 | B-3 | |
| | Kind | Part (%) | Part (%) | Part (%) | Part (%) | Part (%) |
| Example 1 | CW-2 | 47 (7) | — | 30 (6) | — | — |
| Example 2 | CW-2 | 47 (7) | — | 30 (6) | — | — |
| Example 3 | CW-2 | 47 (7) | — | — | 10 (5) | — |
| Comparative Example 1 | CW-2 | 47 (7) | — | 30 (6) | — | — |
| Comparative Example 2 | CW-2 | 47 (7) | — | — | 6 (3) | — |
| Comparative Example 3 | CW-2 | 47 (7) | — | — | — | 6 (3) |
| Example 4 | CAB | 47 (7) | — | — | 6 (3) | — |
| Example 5 | CAB | 47 (7) | — | — | — | 6 (3) |
| Example 6 | CAB | 47 (7) | — | — | — | 6 (3) |
| Example 7 | CAB | 47 (7) | — | — | — | 6 (3) |
| Comparative Example 4 | CAB | 47 (7) | — | 30 (6) | — | — |
| Example 8 | — | — | 50 (10) | 20 (4) | — | — |
| Example 9 | — | — | 50 (10) | 20 (4) | — | — |
| Comparative Example 5 | — | — | 50 (10) | 20 (4) | — | — |

Note:
The numerical values in parenthesis ( ) in the column "Ink composition" represent respective effective contents of the self-dispersible carbon black, the colorant-containing particles and the polymer particles.

| | Ink composition | | | |
|---|---|---|---|---|
| | Water-insoluble organic compound (C) | | Water | Other components |
| | Kind | Part | Part | Part |
| Example 1 | Dibutyl adipate | 0.5 | 9.5 | 13 |
| Example 2 | Dibutyl adipate | 1 | 9 | 13 |
| Example 3 | Dibutyl adipate | 1 | 29 | 13 |
| Comparative Example 1 | — | — | 10 | 13 |
| Comparative Example 2 | — | — | 34 | 13 |
| Comparative Example 3 | — | — | 34 | 13 |
| Example 4 | Dibutyl adipate | 1 | 33 | 13 |
| Example 5 | Dibutyl adipate | 1 | 33 | 13 |
| Example 6 | Tributyl phosphate | 1 | 33 | 13 |
| Example 7 | Tributyl phosphate | 3 | 31 | 13 |

TABLE 1-continued

| | | | | |
|---|---|---|---|---|
| Comparative Example 4 | — | — | 10 | 13 |
| Example 8 | Dibutyl adipate | 1 | 16 | 13 |
| Example 9 | Tributyl phosphate | 1 | 16 | 13 |
| Comparative Example 5 | — | — | 17 | 13 |

| | | Evaluation | |
|---|---|---|---|
| | | High lighter-fastness | |
| | Optical density | 3 min | 10 min |
| Example 1 | ○ (1.41) | ○ | ○ |
| Example 2 | ○ (1.43) | ○ | ○ |
| Example 3 | ○ (1.43) | ○ | ◎ |
| Comparative Example 1 | Δ (1.36) | X | Δ |
| Comparative Example 2 | X (1.35) | Δ | Δ |
| Comparative Example 3 | Δ (1.36) | Δ | ○ |
| Example 4 | ○ (1.42) | ○ | ◎ |
| Example 5 | ○ (1.43) | ◎ | ◎ |
| Example 6 | ○ (1.42) | ○ | ◎ |
| Example 7 | ○ (1.41) | ○ | ○ |
| Comparative Example 4 | Δ (1.37) | X | Δ |
| Example 8 | ○ (1.40) | ◎ | ◎ |
| Example 9 | ○ (1.40) | ◎ | ◎ |
| Comparative Example 5 | Δ (1.38) | Δ | ○ |

Note:
The numerical values in parenthesis ( ) in the column "Optical density" represent measured values.

From the results shown in Table 1, it was confirmed that the water-based inks for ink-jet printing obtained in Examples 1 to 9 were excellent in not only optical density but also high lighter-fastness.

From the comparison between Examples 4 and 5, it was confirmed that the water-based ink obtained in Example 5 which contained the emulsion polymer particles (B-3) produced by using the reactive surfactant was more excellent in high lighter-fastness than the ink obtained in Example 4.

Further, it was confirmed that the inks obtained in Examples 1, 2 and 8 to 9 which were produced using the self-emulsifiable polymer particles (E-1) were more excellent in gloss than the inks obtained in Examples 3 to 7 which were produced using the emulsion polymer particles (B-2) or (B-3).

Meanwhile, the gloss was evaluated by the following method. That is, solid image printing was carried out on a coated paper (photographic paper <glossy>"KA450PSK (tradename)" having a 60° gloss of 41 which was available from Seiko Epson Co., Ltd., using the above ink-jet printer under the following printing conditions:
  Kind of Paper: Photo Printing Paper
  Mode set: Photo
After allowing the printed paper to stand at 25° C. for 24 h, the 20° gloss thereof was measured using a glossmeter "HANDY GLOSSMETER" (tradename; product number: PG-1) available from Nippon Denshoku Industries Co., Ltd.

Production Example 5

Production of Water Dispersion of Self-Dispersible Carbon Black

After mixing 300 g of a commercially available acidic carbon black ("MA-7" (tradename) available from Mitsubishi Chemical Corp.; primary particle size: 24 nm) with 1000 mL of water, 450 g of sodium hypochlorite (effective chlorine concentration: 12%) was dropped into the resultant mixture, and then the mixture was stirred at a temperature of 100 to 105° C. for 10 h. The thus obtained slurry was filtered through "Toyo Filter Paper No. 2" available from Advantis Co., Ltd., to separate the carbon black particles therefrom. The thus separated carbon black particles were fully washed with water. The resultant wet cake of carbon black was dispersed again in 3000 mL of water, and desalted by passing through a reverse osmosis membrane until reaching an electrical conductivity of 0.2 μs. Further, the obtained dispersion of carbon black having a pH of 8 to 10 was concentrated to a carbon black concentration of 10%, thereby obtaining a water dispersion (a-1) of an anionic self-dispersible carbon black containing a —COONa group bonded to a surface thereof. As a result, it was confirmed that the carbon black contained in the water dispersion had an average particle size of 130 nm and an anionic group content of 270 μmol/g, and a solid content of the water dispersion was 10%.

Production Example 6

Production of Polymer Particles

A glass reactor equipped with a stirrer, a thermometer, a reflux condenser and a nitrogen feed tube was charged with 1000 g of ion-exchanged water, 62 g of polyoxyethylene alkyl ether sodium sulfate (product name "LATEMUL E-118B" available from Kao Corporation; effective ingredient content: 26%) and 2.4 g of potassium persulfate, purged with nitrogen, and then placed in a water bath to heat the contents of the reactor to 70° C. Next, 800 g of a monomer mixture containing styrene/2-ethylhexyl acrylate/acrylic acid at a mixing ratio of 49/49/2 was dropped into the reactor over 2 h, and then the contents of the reactor were aged at 80° C. for 2 h, thereby obtaining polymer particles (b-1) having an average particle size of 120 nm and a solid content of 48%.

Example 10

Seventy parts of the water dispersion (a-1) containing the self-dispersible carbon black which was obtained in Production Example 5, 12.5 parts of the polymer particles (b-1), 1 part of 1-isodecyl glyceryl monoether (c-1) (Log P value: 3.39), 5 parts of glycerol, 5 parts of 2-pyrrolidone, 2 parts of isopropyl alcohol, 1 part of "ACETYLENOL EH" available from Kawaken Fine Chemicals Co., Ltd., and 3.5 parts of water were mixed with each other to prepare a dispersion. The thus obtained dispersion was filtered through a 1.2 μm-mesh filter to obtain a water-based ink.

Comparative Example 6

The same procedure as in Example 10 was repeated except for using ion-exchanged water in place of 1-isodecyl glyceryl monoether (c-1), thereby obtaining a water-based ink.

Example 11

Forty five parts of a water dispersion containing the commercially available self-dispersible carbon "CW-2", 12.5 parts of the polymer particles (b-1), 1 part of 1-isodecyl glyceryl monoether (c-1), 5 parts of glycerol, 5 parts of 2-pyrrolidone, 2 parts of isopropyl alcohol, 1 part of "ACETYLENOL EH" available from Kawaken Fine Chemicals Co., Ltd., and 28.5 parts of water were mixed with each other to prepare a dispersion. The thus obtained dispersion was filtered through a 1.2 μm-mesh filter to obtain a water-based ink.

Comparative Example 7

The same procedure as in Example 11 was repeated except for using ion-exchanged water in place of 1-isodecyl glyceryl monoether (c-1), thereby obtaining a water-based ink.

Comparative Example 8

The same procedure as in Example 11 was repeated except for using ion-exchanged water in place of the polymer particles (b-1), thereby obtaining a water-based ink.

Experimental Example

The water-based inks obtained in Examples 10 and 11 and Comparative Examples 6 to 8 were subjected to experiments to evaluate the optical density, water resistance, rubbing resistance and high lighter-fastness thereof by the following methods. The results are shown in Table 2.
(1) Optical Density:
  Measured by the same method as defined above.
(2) High Lighter-Fastness:
  Measured by the same method as defined above.
(3) Water Resistance:
  Solid image printing was carried out on a recycled paper for PPC available from Nippon Kakoseisi Co., Ltd., using the above ink-jet printer. The thus printed paper was naturally dried for 1 h, and then vertically dipped in static water for 10 s and immediately vertically taken out therefrom. After naturally drying the paper at room temperature, the optical density thereof was measured. The residual rate of the optical density after the dipping relative to optical density immediately after printing the solid image was calculated to evaluate a water resistance of the ink according to the following evaluation criteria.
[Evaluation Criteria]
  ○: residual rate: 90% or higher
  Δ: residual rate: not less than 70% but less than 90%
  x: residual rate: less than 70%
(4) Rubbing Resistance:
  Solid image printing was carried out on t a recycled paper for PPC available from Nippon Kakoseisi Co., Ltd., using the above ink-jet printer and dried for one day. Then, the printed surface of the paper was strongly rubbed with fingers to visually observe and evaluate the degree of rubbing-off of the printed images according to the following evaluation criteria.
[Evaluation Criteria]
  ○: Substantially no rubbing-off of printed images, and no blackish contamination of surrounding portions
  Δ: Slight rubbing-off of printed images as well as slight blackish contamination of surrounding portions and fingers
  x: Considerable rubbing-off of printed images, and severe blackish contamination of surrounding portions and fingers

TABLE 2

| | Ink composition | | | | | |
|---|---|---|---|---|---|---|
| | Component (A) | | Polymer particles (B) | | Component (C) | |
| | Kind | Part (%) | Kind | Part (%) | Kind | Part (%) |
| Example 10 | a-1 | 70 (7) | b-1 | 12.5 (6) | c-1 | 1 |
| Comparative Example 6 | a-1 | 70 (7) | b-1 | 12.5 (6) | — | — |
| Example 11 | CW-2 | 45 (10.5) | b-1 | 12.5 (6) | c-1 | 1 |
| Comparative Example 7 | CW-2 | 45 (10.5) | b-1 | 12.5 (6) | — | — |
| Comparative Example 8 | CW-2 | 45 (10.5) | — | — | c-1 | 1 |

Note:
The numerical values in parenthesis ( ) in the column "Ink composition" represent respective effective contents of the self-dispersible carbon black and the polymer particles.

| | Evaluation | | | | |
|---|---|---|---|---|---|
| | Optical density | Water resistance | Rubbing resistance | High lighter-fastness | |
| | Kind | Part (%) | Kind | 3 min | 10 min |
| Example 10 | ○ (1.41) | ○ (99) | ○ | ○ | ◉ |
| Comparative Example 6 | X (1.25) | ○ (99) | ○ | Δ | ○ |
| Example 11 | ○ (1.42) | ○ (99) | ○ | ○ | ◉ |
| Comparative Example 7 | X (1.22) | ○ (99) | ○ | Δ | ○ |
| Comparative Example 8 | ○ (1.40) | Δ (85) | X | X | X |

Note:
The numerical values in parenthesis ( ) in the columns "Optical density" and "Water resistance" represent measured values.

From the results shown in Table 2, it was confirmed that the water-based inks obtained in Examples 10 and 11 were higher in optical density and more excellent in water resistance, rubbing resistance and high lighter-fastness as compared to those obtained in Comparative Examples 6 to 8.

INDUSTRIAL APPLICABILITY

The water-based ink containing the water dispersion for ink-jet printing according to the present invention not only satisfies a high optical density but also exhibits an excellent high lighter-fastness and, therefore, can be suitably used as a water-based ink for ink-jet printing.

Also, the print produced by using the ink of the present invention is excellent in optical density and high lighter-fastness.

The invention claimed is:
1. A process for producing a water dispersion for ink-jet printing, comprising:
  (1) producing (B) polymer particles, which consist of (meth)acrylic-styrene-based polymer, by emulsion-polymerizing a first ethylenically unsaturated monomer which is a styrene based monomer with a (meth)acrylic ester;
  (2) mixing:
  (A-1) polymer particles comprising a pigment and a second polymer obtained by polymerizing a second ethylenically unsaturated monomer;
  said (B) polymer particles;
  (C) at least one water-insoluble organic compound selected from the group consisting of an aliphatic di-carboxylic ester and an aliphatic tri-carboxylic ester; and
  water;
  wherein:
  said (B) polymer particles comprise no pigment;
  said water is present in an amount of from 40 to 80% by weight based on the total weight of said water dispersion;

said mixing forms a water dispersion in which at least a portion of said water-insoluble organic compound (C) is in a separate phase from said polymer particles (A-1) and (B); and said polymer particles (B) and said organic compound (C) are present in a weight ratio of 15/1 to 1/2.

2. A process according to claim 1, wherein said water-insoluble organic compound (C) enhances an interaction between polymer particles (A-1), (B) or both and said water-insoluble organic compound (C) has a Log P value of from 1 to 11.

3. A process according to claim 1, wherein said producing polymer particles (B) by emulsion-polymerizing a first ethylenically unsaturated monomer which is a styrene based monomer with a (meth)acrylic ester is conducted in the presence of a reactive surfactant.

4. A process according to claim 1, wherein said water-insoluble compound (C) is present in the water dispersion in an amount of 0.4 to 10% by weight.

5. A process according to claim 1, wherein said first polymer and said second polymer are the same.

6. A process according to claim 1, wherein said first polymer and said second polymer are different and said (A-1) polymer particles and said (B) polymer particles are separate polymer particles.

7. A process according to claim 1, wherein said (B) polymer particles are particles of a water-insoluble vinyl polymer.

8. A process according to claim 1, wherein said pigment is uniformly dispersed in said (A-1) polymer particles.

9. A process according to claim 1, wherein said pigment is enclosed in said (A-1) polymer particles.

10. A process according to claim 1, wherein:

said polymer of said polymer particles (A-1) comprises polymerized units of methacrylic acid and a styrene macromer;

said pigment is a carbon black;

said polymer particles (A-1) are present in an amount of from 1 to 20% by weight;

said polymer particles (B) are present in an amount of from 0.1 to 15% by weight;

said water-insoluble compound (C) is present in an amount of from 0.4 to 10% by weight; and said compound (C) is dibutyl adipate.

11. A process according to claim 1, wherein said organic compound (C) is at least one aliphatic di-carboxylic ester.

12. A process according to claim 1, wherein said organic compound (C) is at least one aliphatic tri-carboxylic ester.

13. A process according to claim 1, wherein said polymer particles (A-1) and (B) are separate from one another.

* * * * *